April 18, 1933.  B. H. UHRICH  1,904,106
CABLE LOCK FOR REVOLVING DOORS
Filed April 11, 1932  2 Sheets-Sheet 1
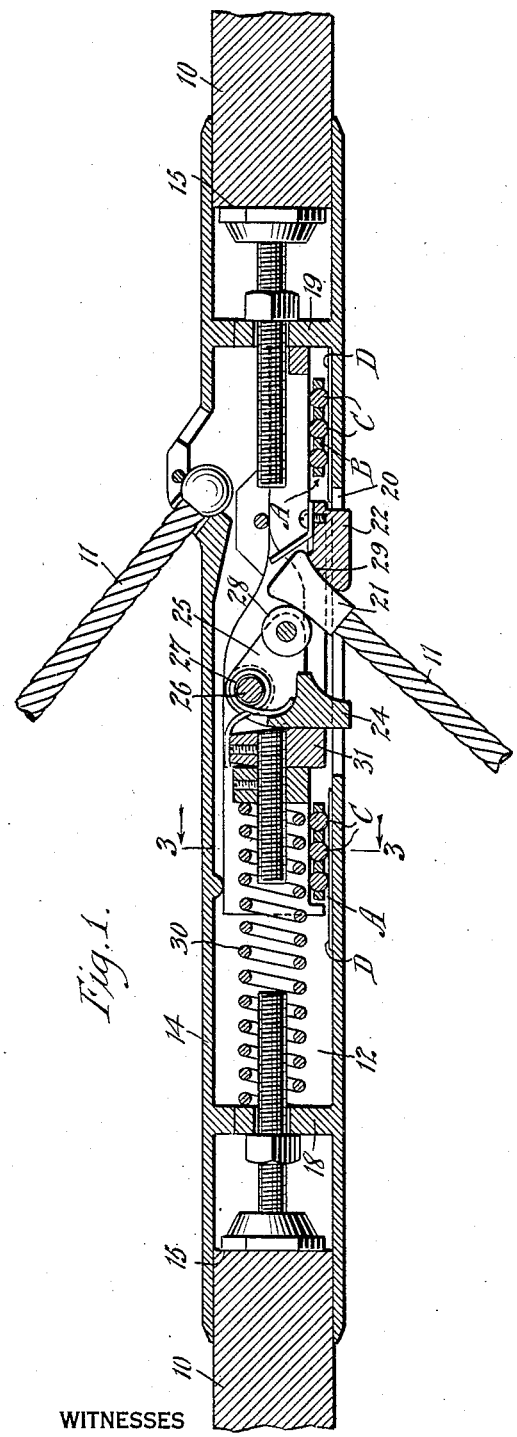
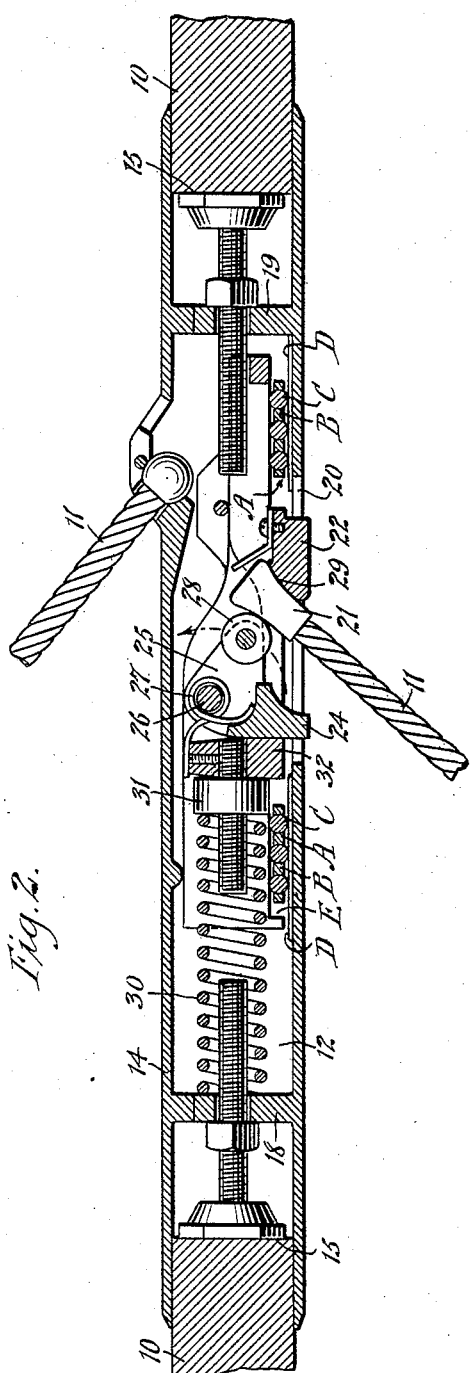
WITNESSES
Edw. Thorpe
Hugh H. Ott
INVENTOR
B. H. Uhrich
BY Munn & Co.
ATTORNEY April 18, 1933.  B. H. UHRICH  1,904,106
CABLE LOCK FOR REVOLVING DOORS
Filed April 11, 1932  2 Sheets-Sheet 2
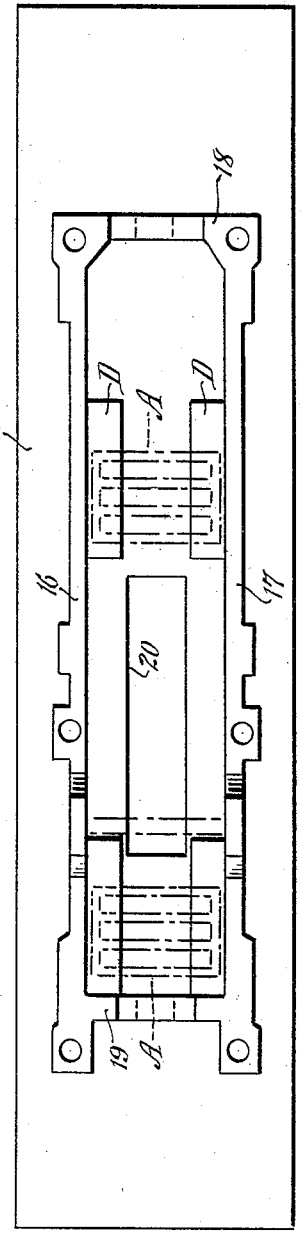
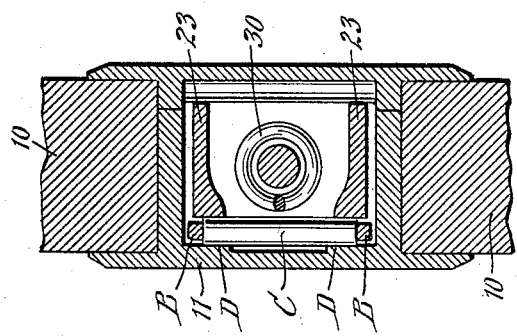
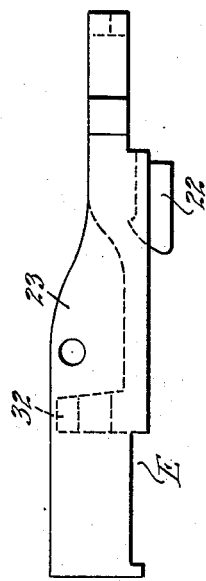
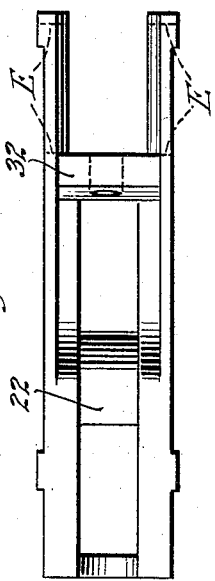
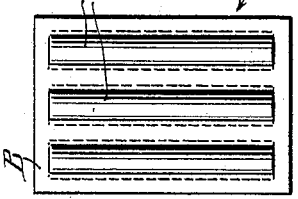
INVENTOR.
B. H. Uhrich
BY Munn & Co.
ATTORNEY
WITNESSES
Edw. Thorpe
Hugh H. Ott Patented Apr. 18, 1933

1,904,106

UNITED STATES PATENT OFFICE

BURNS H. UHRICH, OF INDEPENDENCE, KANSAS, ASSIGNOR TO THE ATCHISON REVOLVING DOOR CO., OF INDEPENDENCE, KANSAS, A CORPORATION OF DELAWARE

CABLE LOCK FOR REVOLVING DOORS

Application filed April 11, 1932. Serial No. 604,607.

This invention has to do with revolving doors of the type in which the wings are held in radial position by a cable extending between each adjacent pair of wings, each cable being permanently anchored at one end to one wing and detachably secured at its other end to the adjacent wing by a lock mechanism which is designed to be releasable under a predetermined pressure exceeding that required to revolve the door in its ordinary operation.

It has been observed that cable locks of this character which have been previously devised and in actual use, are open to certain objections and possess certain deficiencies, notably, the tendency of the slidable gripper to become more and more difficult to release, due to an increase in the coefficient of friction between the slide and the guide surfaces, said increase resulting from various causes, such as the presence of dirt, grit, gummed lubricant or the like. This variation in the coefficient of friction materially affects the degree of pressure or force required for the release of the cable and may in some instances, such as a panic, prove disastrous.

It is, therefore, an object of the present invention to overcome the above recited objections and deficiencies by embodying in a cable locking mechanism of this character certain improved features, by virtue of which the variation in the coefficient of friction is practically eliminated or at least so minimized that the pressure or force required to effect release of the cable remains so nearly uniform for the life of the door that said variation may be considered practically negligible.

More particularly, the invention comprehends in a cable lock of the indicated character including a slidable gripping device, the employment of what may be termed an unfixed or floating roller bearing carriage or carriages which are disposed between the device and the guide or bearings therefor, whereby said devices are permitted free and unhampered relative movement so as not to offer any material resistance or impediment to the movement of the device in excess of the predetermined spring pressure required, and this irrespective of lubrication or other attention for a considerable period of time.

As a further object, the invention resides in the embodiment of the improved features in a cable lock of the character set forth, without unduly complicating the structure or materially adding to the cost of production, while increasing to a marked degree the general efficiency thereof.

With the above recited and other objects in view, reference is made to the following specification and accompanying drawings, in which a preferred form of the invention is disclosed, while the appended claims define the actual scope thereof.

In the drawings:

Figure 1 is a horizontal sectional view through a cable lock embodying the improved features of the invention, and illustrating the parts in normal position locking the cable.

Figure 2 is a similar view illustrating a partial movement of the slidable gripping device to a position for releasing the cable.

Figure 3 is an enlarged transverse sectional view taken approximately on the line indicated at 3—3 in Figure 1.

Figure 4 is an inner face view of the escutcheon plate or casing section over which the gripping device moves and against which it has its principal bearing.

Figure 5 is a detail plan view of the frame of the gripping device.

Figure 6 is a side view thereof.

Figure 7 is an enlarged side view of one of the rollable anti-friction bearing units.

For the purposes of illustration only, the improved features of the present invention are disclosed as incorporated in a cable lock of the type set forth in the Haviland patent, No. 1,185,313, granted May 30, 1916, although it is to be understood that said features may be embodied in other similar cable locking mechanisms to which the same may be applicable.

In order to make for a clear understanding, the various old elements of the cable lock which are necessary to a proper disclosure will now be described and referred to in the drawings by reference numerals, while the improved features will be identified by reference letters. In the drawings, 10 designates the wing of a revolving door, 11 the cables, and 12 the lock which includes a pair of escutcheon plates hereinafter termed the body plate 13 and the cover plate 14, said plates being of an appropriate size and applied in flat contact to the opposite surfaces of the wing at the proper point to cover and conceal an opening or cut-out portion 15 which extends completely through the thickness of the wing. The body plate 13 is formed with a pair of vertically spaced parallel inwardly directed flanges 16 and 17 joined by vertical end flanges 18 and 19 which are preferably cast or otherwise secured to or formed integral with the body plate 13. A slot 20 is formed in the plate within the confines of the flanges 16, 17, 18 and 19, and in addition to permitting of the introduction therethrough of the cable terminal piece or head 21, receives therethrough the projecting portion 22 of the frame 23 of a gripping device and the protruding terminal 24 of a pivoted gripper element 25 which is carried by the frame. The pivoted gripper element is mounted on a fulcrum 26 and is normally urged by a spring 27 whereby the gripper roller 28 coacts with the abutment surface 29 of the projecting portion 22 to retain the cable tip or head 21 in locked condition. As is customary in this type of device, a coiled expansion spring 30 is interposed between the flange 18 and an adjustable abutment 31 supported from the cross piece 32 of the frame of the gripping device, for normally urging the gripping device to the position illustrated in Figure 1 and for tensioning said device against movement in the opposite direction. It is, of course, understood that movement of the device to the left, as illustrated in Figures 1 and 2, will eventually cause the terminal 24 of the pivoted gripping element to engage with the left end of the slot to trip and swing the gripper element for releasing the cable tip or terminal 21. Previously, the frame 23 of the gripping device was borne on the inner face of the body plate 13 for sliding movement, and in some instances a roller was journaled in the frame to bear on the inner surface of the body plate. As previously set forth, due to the entrance of grit, dirt, gummed lubricant or other foreign matter, or wear, the coefficient of friction between the gripping device frame and the inner face of the body escutcheon plate varied and increased to such an extent that the force or pressure required to effect the release of the cable terminal became so excessive as to not only strain the structure and result in breakage or damage but to present a hazard in event of the necessity of an emergency collapsing of the door. In order to remedy this condition, the present invention broadly comprehends the employment of rollable anti-friction bearing units A interposed between the opposite ends of the gripping device frame and the inner surface of the body escutcheon plate 13. The units A may assume varying forms, but in the present instance, for the purposes of illustration, these units consist of carriages B in the nature of slotted plates which carry and have journaled therein a plurality of roller bearings C, the diameters of which roller bearings exceed the thickness of the carriages or plates B, so that the diametrically opposite points of the peripheries protrude beyond the opposite major surfaces of the plates or carriages. The units A, while interposed between the gripping device frame and the inner surface of the body escutcheon plate, are not connected with either of said parts, thus making for a free and unhampered rolling movement of the gripping device and a relative movement of the units with respect to the gripping device and with reference to the body escutcheon plate. In order to further reduce friction, the inner surface of the escutcheon plate at the points where the rollable anti-friction bearing units operate is formed with laterally spaced upstanding bearing ribs or tracks D. In practice, the relative movement of the right-hand unit longitudinally of the lock casing is confined and limited by the vertical flange 19 and the projecting portion 22 of the frame of the gripping device, while the left-hand unit A is limited or confined in its longitudinal movement by the notched portions E of the side rails of the gripping device frame.

From the foregoing, it will thus be seen that the unfixed or floating rollable anti-friction bearing units which are unconnected with either the guide or gripping device make for a cable locking mechanism in which the coefficient of friction is not only minimized but is substantially or practically uniform throughout the length of life of the mechanism, whereby the pressure for effecting release is practically invariable.

What is claimed is:

1. In a revolving door wing cable lock which includes a movable cable terminal gripping device normally urged to a position to lock the cable and a casing embodying a guide for said device; a rollable anti-friction bearing unit interposed between the device and the guide and unconnected with said device or guide.

2. In a revolving door wing cable lock which includes a movable cable terminal gripping device normally urged to a position to lock the cable and a casing embodying a guide for said device; a rollable anti-friction bearing unit interposed between the device and the guide for relative rolling movement with respect to said device and guide.

3. In a revolving door wing cable lock which includes a movable cable terminal gripping device normally urged to a position to lock the cable and a casing embodying a guide for said device; a rollable anti-friction bearing unit interposed between the device and the guide for relative rolling movement with respect to said device and guide, said unit consisting of a carriage and turnable anti-friction elements in said carriage.

4. In a revolving door wing cable lock which includes a movable cable terminal gripping device normally urged to a position to lock the cable and a casing embodying a guide for said device; a rollable anti-friction bearing unit interposed between the device and the guide for relative rolling movement with respect to said device and guide, said unit consisting of a carriage and a plurality of turnable anti-friction rollers journaled in the carriage with the peripheries thereof extending beyond the opposite major surfaces of the carriage for respectively engaging the device and the guide.

5. In a revolving door wing cable lock which includes a movable cable terminal gripping device normally urged to a position to lock the cable and a casing embodying a guide for said device; a rollable anti-friction bearing unit interposed between the device and the guide for relative rolling movement with respect to said device and guide, said unit consisting of a carriage and a plurality of turnable anti-friction rollers journaled in the carriage with the peripheries thereof extending beyond the opposite major surfaces of the carriage for respectively engaging the device and the guide and said guide consisting of laterally spaced bearing tracks.

6. In a revolving door wing cable lock which includes a movable cable terminal gripping device normally urged to a position to lock the cable and a casing embodying a guide for said device; a rollable anti-friction bearing unit interposed between the device and the guide for relative rolling movement with respect to said device and guide, said device having a notched portion for limiting said relative rolling movement of the unit.

BURNS H. UHRICH.